United States Patent [19]

MacLachlan

[11] Patent Number: 4,975,236
[45] Date of Patent: Dec. 4, 1990

[54] METHOD OF PRE-SHAPING AND VACUUM MOLDING A THERMOPLASTIC SHEET

[76] Inventor: Oscar MacLachlan, 412 E. 13th St., Vancouver, Wash. 98660

[21] Appl. No.: 367,562

[22] Filed: Jun. 19, 1989

[51] Int. Cl.⁵ .............................................. B29C 51/10
[52] U.S. Cl. .................................... 264/553; 156/492; 264/554; 264/291; 264/294
[58] Field of Search ............... 264/553, 554, 164, 291, 264/292, 294; 156/285, 475, 492

[56] References Cited
FOREIGN PATENT DOCUMENTS
2187132 9/1987 United Kingdom ................. 264/553

Primary Examiner—Jill L. Heitbrink
Attorney, Agent, or Firm—Kolisch, Hartwell & Dickinson

[57] ABSTRACT

A method of shaping a thermoplastic sheet. The sheet is mounted on an articulated frame and pre-shaped by swinging hinged sections of the frame toward each other. A vacuum mold is then placed with its molded surfaces adjacent the pre-shaped sheet. Vacuum applied to the mold finally shapes the sheet.

6 Claims, 2 Drawing Sheets

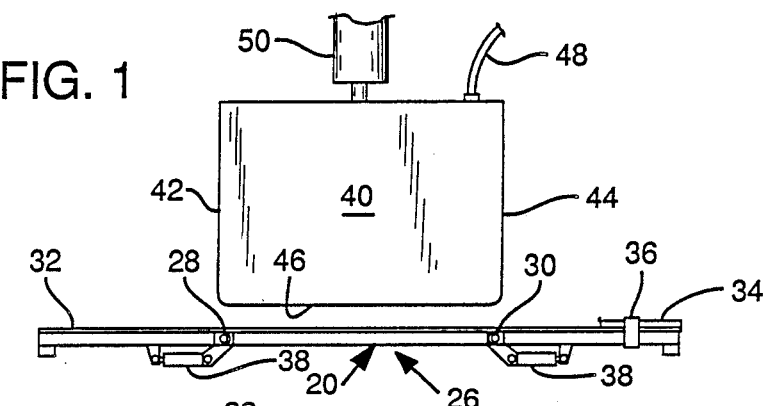
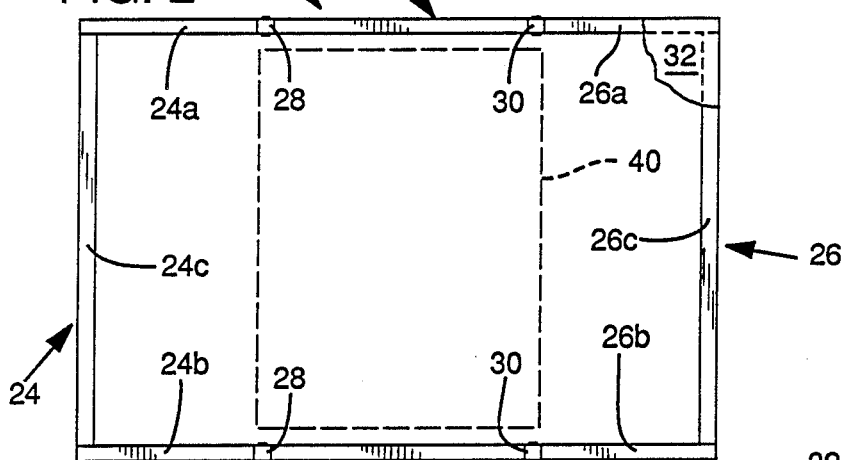
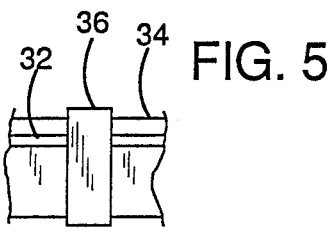
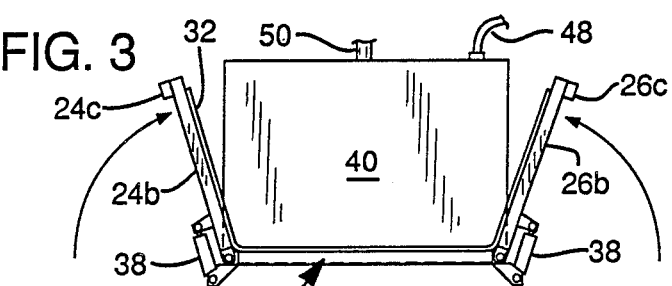
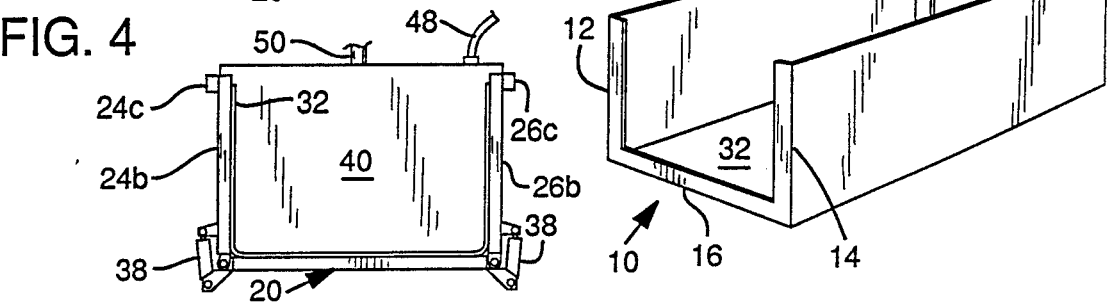

METHOD OF PRE-SHAPING AND VACUUM MOLDING A THERMOPLASTIC SHEET

BACKGROUND AND SUMMARY OF THE INVENTION

This invention relates to a method of shaping a thermoplastic sheet, whereby an article such as a canopy for the pick-up box of a pick-up truck, or the liner of a shower stall, may be formed. Such an article generally has two spaced apart and opposed sides, and a joining expanse extending transversely of these sides and together with the sides providing a generally U-shaped profile to the article.

The molding process known in the art for manufacturing parts such as pick-up truck canopies, utilizes a so-called "snap back" system. Describing the system, a sheet of material is first heated whereby it becomes soft and tends to droop of its own weight inwardly of the supported margins of the sheet. A vacuum box with a hollow interior is then brought up against the underside of the material, and the material caused further to sag into the interior of the vacuum box by the application of a vacuum. The mold that finally shapes the material is then inserted into the vacuum box, into the concave region of the deformed sheet. A vacuum is then drawn through the mold, which causes the sheet material to snap back and to cling to the periphery of the mold. The vacuum box is then removed and the formed sheet of material cooled and removed from the mold.

A problem resulting from the use of such a system is exemplified by the fact that the sheet material has a thickness after shaping which might be, for instance, 40% of the thickness of the original sheet. By using the vacuum box, an effort is made to have this reduction in thickness uniform throughout the sheet, but this is rarely achieved. At regions such as corners of the molded object, the thickness tends to be considerably less than the thickness of the sheet in other regions. As a consequence, the molded product has a non-uniform thickness throughout.

Plastic sheeting used in making product frequently may be a laminated type product, with an outer so-called rovel layer of expensive plastic which is the exterior of the formed product, and relatively thin, and a back-up layer of so-called ABS plastic which is cheaper and gives structural strength. When molding a product from a laminated sheet, problems arising because of unevenness of the sheet are magnified.

Additionally, and in making a canopy, such usually has a top and two sides. A product produced as just described tends to have a top and four sides, meaning that two of the opposed sides have to be trimmed away to produce the final canopy. The cut away material is recycled, but still represents an expense figure in making the canopy.

The method of the invention features pre-forming of a sheet of material from manipulation of a support for the sheet whereby the sheet is shaped to have two opposed side portions and a connecting expanse, similar to the shape of the final product. Associated with the pre-formed sheet is a mold which has mold surfaces forming a pair of sides and an interconnecting expanse. Pre-shaping is done with the pre-shaped sheet extending in close adjacency to the mold surfaces described. With pre-shaping and positioning of the mold, a vacuum may be applied to the mold to bring the sheet firmly against the mold surfaces and to form the final sheet. There is minimal uneven stretching of the sheet whereby thick and thin regions are produced. Products may be formed which are two-sided rather than four-sided, thus minimizing wastage of the plastic material. The formed plastic body having two sides, and without four sides, may be flexed slightly to produce freeing of so-called undercut regions, not easily performed with a four-sided molded body. Flexibility is provided in the types of body shapes which can be produced with the system of the invention.

A general object of the invention, therefore, is to provide a novel molding method which includes pre-shaping of a sheet supported on a support means, with pre-shaping performed by manipulating the support means to produce the shape desired.

Another object is to provide a method of molding a plastic sheet which makes possible the molding of bodies having only two sides joined by an expanse, rather than four sides.

A further object is to provide a molding method which minimizes the production of thick and thin spots in the molded product.

A further object is to provide a molding method which permits release easily of the molded product even though such may have so-called undercut regions which would make removal of such a product from a mold nearly impossible with a conventional snap back technique.

According to one embodiment of the invention, the sheet is preformed, and positioned so that its opposed side portions and connecting expanse extend in close adjacency to the external surfaces of a male mold. With a vacuum applied, the sheet is drawn against the mold surface to form an article such as a canopy where external surfaces have original sheet smoothness without taking the imperfections of the mold.

In another embodiment, the sheet is preformed and positioned so that its opposed side expanses and connecting expanse extend in close adjacency to the internal surfaces of a female mold. With a vacuum applied, the sheet is drawn against the internal mold surfaces to form an article such as a shower stall liner where internal surfaces have original sheet smoothness without taking the imperfections of the mold.

BRIEF DESCRIPTION OF THE DRAWINGS

These and other objects and advantages are attained by the invention, which is described in conjunction with accompanying drawings, wherein:

FIG. 1 is a simplified side elevation illustrating apparatus usable in performing the method of the invention, such including a vacuum mold and an articulated open frame which may be utilized to support the margins of a plastic sheet which is to be formed using the process contemplated;

FIG. 2 is a plan view illustrating the articulated frame which is part of the apparatus shown in FIG. 1;

FIG. 3 illustrates the apparatus of FIG. 1 with the articulated frame manipulated to produce preforming of the plastic sheet and with the mold lowered to approximately its final position with respect to the sheet;

FIG. 4 illustrates the mold apparatus with the frame finally closed and full vacuum applied to the mold;

FIG. 5 is an enlarged view showing a way of clamping a sheet to a supporting frame;

FIG. 6 shows a plastic body produced with the invention;

DETAILED DESCRIPTION OF A PREFERRED EMBODIMENT

Figure 7:
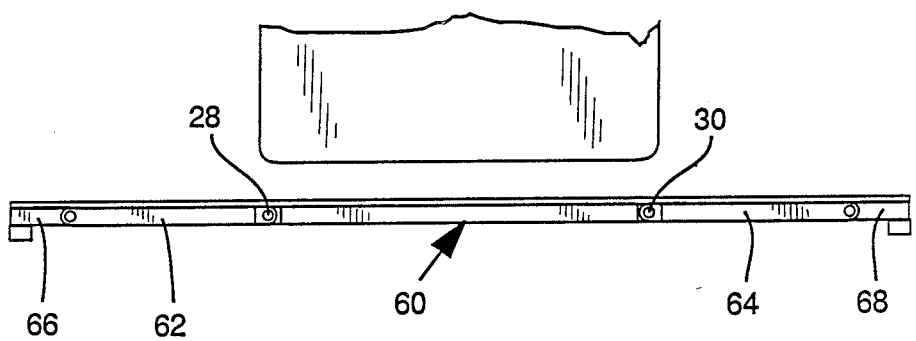
FIGS. 7, 8 and 9 illustrate a modified form of mold apparatus which may be utilized, for instance, in producing what is referred to for convenience herein as an undercut in the molded product.

Referring now to the drawings, for the purpose of explanation, it will be assumed that it is desired to manufacture a final body having the shape illustrated in FIG. 6. The body, shown at 10, has opposed substantially parallel sides 12 and 14 which are spaced from each other, and joining margins of these sides a transversely extending expanse designated generally at 16. The body described typically might be used, for instance, as a truck canopy, although by describing such a specific use is not thereby intended to limit the use of the articles herein manufactured. In an article such as a canopy, the external or outwardly facing surfaces of sides 12, 14 and expanse 16 desirably should have original sheet smoothness.

Typically, such a shaped body might be manufactured from a thermoplastic sheet which is softened by the application of heat and then shaped to form the body. Various forms of thermoplastic materials may be employed in the sheet as exemplified by the so-called acrylic resins, and blends thereof, such as ABS resin, which is a blend of acrylic, butadiene and styrene. Not uncommonly, and as already discussed, a laminar-type product may be utilized, including one layer of plastic selected, for instance, for its strength and superimposed over this layer another layer characterized by scratch resistance or some other property which is found desirable as a finish for the product made.

In shaping a plastic sheet to produce the body indicated, apparatus may be employed such as illustrated in FIGS. 1 through 4.

Referring to these figures, illustrated generally at 20, is what is referred to herein as a sheet support means. This support means supports the margins of a sheet with the sheet inwardly of its supported margins being unsupported. The sheet support means pictured takes the form of an articulated open frame, and includes a mid-section 22 which supports a mid-region of a plastic sheet. Pivotally connected to this mid-section is one end section 24, and pivotally connected to the opposite side of the section is an end section 26.

Mid-section 22, as illustrated, takes the form of a pair of elongate frame members shown at 22a, 22b. End section 24 includes frame members 24a, 24b. and these are pivotally or hingedly joined to members 22a, 22b by hinges 28. Interconnecting the ends of frame members 24a, 24b is a cross piece 24c.

Similarly, end section 26 includes frame members 26a, 26b. These are pivotally mounted on opposite extremities of frame members 22a, 22b by hinges 30. Joining the ends of the frame members 26a, 26b is a cross member 26c.

A flexible thermoplastic sheet is mounted on sheet support 20 by supporting such as on the upper side of the mid and end sections as shown in FIG. 1 with such positioned as indicated by sheet 32.

Suitable clamping means is provided for holding the sheet in place on the open frame. Such has not been indicated in FIG. 2 for reasons of simplicity. However, referring to FIG. 5, such may take the form of thin clamp bars, such as those shown at 34 clamped against the members of the open frame as by clamps 36.

The cross members or cross pieces 24c, 26c may be mounted on the underside of the frame members of the end sections. In this way they suitably support the frame members in each end section but permit a mold surface to move past the plane of the sheet which is supported on the end section when the apparatus is employed in shaping a sheet.

In utilizing the equipment, mid-section 22 of the open frame normally is stationary. End sections 24, 26 may be relatively pivoted with respect to the mid-section to move ends thereof closer to each other as shown in FIG. 3, through actuation of fluid-operated means such as the rams shown at 38.

Indicated at 40 is a male vacuum mold having outwardly facing external mold surfaces shown at 42, 44 and 46 which collectively provide as what might be referred to herein as a U-shaped profile to the mold surface of the mold. Such has bores or apertures distributed over the mold surfaces (not shown), and a vacuum is applied to these bores utilizing vacuum line 48. The mold is moved vertically in a defined path through actuation of a fluid-operated ram 50.

Utilizing the apparatus described in performing the method of the invention, a sheet is supported on frame or sheet support 20 with such disposed as sheet 32 depicted in FIG. 1 extending over the top of the frame and generally occupying a plane. Heat is applied to the sheet whereby such becomes plastic and shapable.

In forming the sheet, end sections 24, 26 are swung toward the mid-section, as shown in FIG. 3, to preform the sheet, with the sheet having, as preformed or preshaped, opposed side expanses joined by a transversely extending expanse. Prior to, or if need be after, manipulating the frame to produce such preforming, mold 40 is lowered to advance it relative to the frame. Preferably with such advancement, the base of the mold is moved downwardly through the plane of the sheet where such extends across the mid-section of the open frame. This is the condition shown in FIG. 3. End sections of the open frame, with the mold so pre-positioned, are then swung further toward each other to finally close the molding apparatus as pictured in FIG. 4. This places the expanses of sheet which extend across the frame members in the end sections with such disposed relatively tightly against the sides. Vacuum may then be applied utilizing vacuum line 48 to the bores which are distributed over the mold surfaces in the mold, to firmly draw through vacuum the sheet expanses up against the mold surfaces.

After cooling, the molded shaped body is easily removed. This is performed, if necessary, by swinging the end sections outwardly slightly, to produce clearance, and then raising the mold. The molded part may then be removed from the open frame.

Because there has been preshaping of the sheet and no extensive stretching of localized regions, the part produced has a more-or-less uniform thickness. It will be noted that an essentially two-sided body is produced, comprising two sides and a connecting expanse, unlike the four-sided body that is produced with the so-called "snap-back" system earlier described. With the body formed having essentially no walls interconnecting sides 12 and 14 in regions remote from expanse 16, the sides are relatively easily flexed outwardly to the extent necessary to produce easy freeing of the body formed from the mold.

Figure 8:
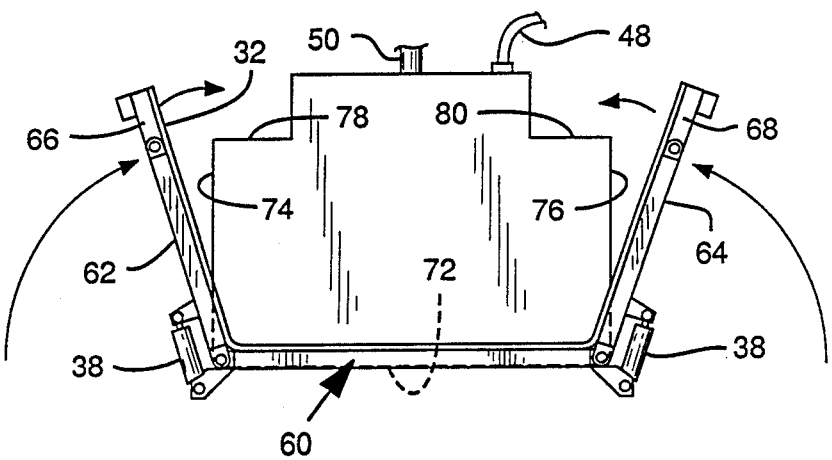
Figure 9:
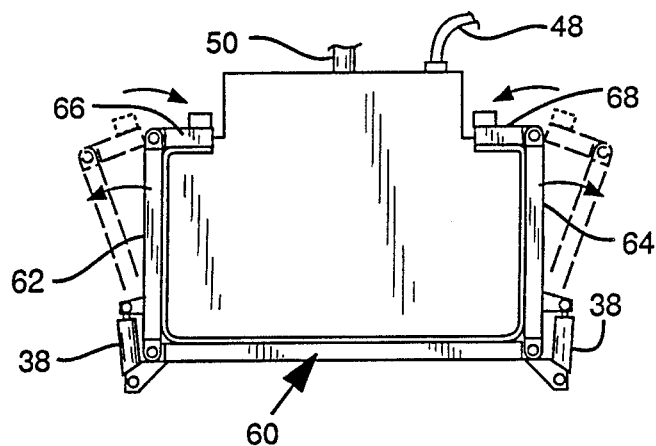

Referring to FIGS. 6, 7 and 8, bodies can be produced with the invention with a substantial undercut, as represented in FIG. 9. To produce such a body, the open frame or sheet support may have a mid-section as shown at 60, and hingedly joined to this mid-section first and second end sections 62 and 64. These end sections, unlike those earlier described, have further pivoted or hinged portions as exemplified by terminal section 66 of end section 62, and terminal section 68 of end section 64, which are hinged to the remainder of the end sections and can be swung relative to the remainder of the end sections, as illustrated in FIG. 8.

A mold may be utilized such as shown at 70 which includes mold surfaces 72, 74, 76 as well as undercut surfaces 78, 80.

With the sheet heated and the mold lowered to come against the sheet, and with the end sections swung upwardly, and with final closing of the mold by movement of the terminal sections 66, 68 to snugly overlay the undercut surfaces 78, 80 of the mold as shown in FIG. 8, a body is formed which has substantial undercut in opposite sides thereof. The body is releasable from the mold apparatus by swinging the end sections outwardly to provide the clearance necessary whereby the mold may be raised away from the sheet.

With a female mold, mold surfaces corresponding to surfaces 42, 44, 46 are internal mold surfaces, and extend along the interior of the mold and face inwardly. In using such a mold, a sheet is secured to an articulated frame, and the sheet preformed to approximately the shape of the internal mold surfaces of the mold. The frame and sheet are then positioned within the mold. A vacuum applied to the mold functions to pull the sheet against the internal surfaces of the mold. An article having approximately the shape of the article shown in FIG. 6 may be produced, having inwardly facing surfaces possessing original sheet smoothness.

While various modifications of the invention have been described, it is obvious the variations and modifications are possible without departing from the invention. It is intended to cover all such variations and modifications coming within the scope of this invention.

It is claimed and desired to secure by Letters Patent:

1. A method of molding a thermoplastic sheet to produce a final body having opposed spaced sides and a joining expanse extending transversely of and joining said sides, the method comprising:
    providing support means for the sheet which supports the sheet at its margins and with the sheet inwardly of its markings unsupported,
    providing a mold having a mold surface conforming to the shape of the final body desired,
    manipulating the support means independently of the mold to pre-shape the sheet as a pre-shaped body having spaced sides and a joining expanse approximating the shape of the final body to be produced, and positioning the mold whereby its mold surface extends approximately parallel to the sides and joining expanse to the pre-shaped body produced by said manipulation of the support means, and
    applying a vacuum to the mold to firmly draw the expanses of the pre-shaped sheet against the mold surfaces of the vacuum mold.

2. The method of claim 1, wherein the mold surface of the mold is an external outwardly facing mold surface with said and transverse expanses forming a U-shaped profile, and wherein the support means is manipulated to pre-shape the sheet to have a U-shaped profile with expanses disposed outwardly of and embracing the mold surface of the mold.

3. The method of claim 1, wherein the mold surface of the mold is an internal inwardly facing mold surface with side and transverse expanses forming a U-shaped profile, and wherein the support means is manipulated to pre-shape the sheet to have a U-shaped profile with expanses disposed inwardly of the mold surface of the mold.

4. The method of claim 1 wherein the support means provided includes a midsection for supporting a portion of the sheet between the ends of the sheet, and first and second end sections disposed on either side of said midsection for supporting end portions of the sheet, the first and second end sections being relatively hingedly connected to the midsection, and manipulation of the support means is performed by swinging the end sections about their hinge connections with the midsection.

5. A method of molding a thermoplastic sheet to produce a final body having opposed sides and an expanse extending transversely of and joining marginal portions of said sides, the method comprising:
    providing an open support for said sheet, the support contacting margins of the sheet adjacent the sheet's ends and in regions of the sheet between the ends of the sheet but leaving the sheet unsupported inwardly from said margins,
    mounting a sheet on said support with the sheet extending generally as a plane as supported by the support,
    the support having a midsection and an end section hinged to each of the opposite ends of the midsection, preshaping the sheet by swinging the end sections relative to the midsection, without relying on forces transmitted to the support by the sheet mounted on the support, so that end extremities move toward each other and the sheet supported on the support extends so as to have a U-shaped profile,
    positioning a mold having a mold surface with a U-shaped profile adjacent the sheet as so preshaped with the mold then having portions of the surface extending generally parallel to the expanses of the sheet as so pre-shaped,
    applying vacuum through the mold to bring the sheet firmly against the mold surface of the mold to finally shape the sheet,
    prior to shaping, applying heat to the sheet to render it plastic, and
    after final shaping, cooling the sheet and then separating the sheet from the mold surface and removing the sheet from the support.

6. A method of molding a thermoplastic sheet to produce a final body having opposed sides and an expanse extending transversely of and joining marginal portions of said sides, the method comprising:
    forming the sheet as a body having a generally U-shaped profile by manipulating peripheral markings of the sheet independently of any forces transmitted to the sheet through contact of inner regions bounded by the sheet's peripheral markings,
    positioning a mold having a mold surface with a U-shaped profile so that the U-shaped profile of the mold surface extends generally alongside the U-shaped profile of said sheet body, and
    applying vacuum through the mold to bring the sheet firmly against the mold's surface of the mold finally to shape the sheet.

* * * * *